United States Patent [19]

Weber

[11] 4,109,184
[45] Aug. 22, 1978

[54] METHOD AND APPARATUS FOR PROVIDING A STABLE, HIGH GAIN SERVO SYSTEM

[75] Inventor: Donald William Weber, Fremont, Calif.

[73] Assignee: Ampex Corporation, Redwood City, Calif.

[21] Appl. No.: 668,667

[22] Filed: Mar. 19, 1976

[51] Int. Cl.² ............................................. H02P 5/00
[52] U.S. Cl. ................................. 318/327; 318/341; 318/345 A
[58] Field of Search ............... 318/310, 311, 312, 314, 318/317, 325–327, 329, 341, 345

[56] References Cited

U.S. PATENT DOCUMENTS

| 3,241,023 | 3/1966 | Eby | 318/314 |
| 3,935,522 | 1/1976 | Tsay | 318/345 |

*Primary Examiner*—Robert K. Schaefer
*Assistant Examiner*—Michael K. Mutter
*Attorney, Agent, or Firm*—Robert G. Clay; Ralph L. Mossino

[57] ABSTRACT

A servo system is disclosed for accurately regulating velocity of a rotating drum, preferably for guiding a magnetic tape of a recording and reproducing system. The method and apparatus is characterized in that generation of a ramp signal is commenced in response to a first one of a series of tach signals provided at a rate proportional to the velocity of rotation of the drum, the ramp signal being interrupted for a predetermined time duration and thereafter recommenced, the ramp signal subsequently being monitored upon occurrence of a second tach signal in order to produce an error signal for adjusting velocity of the drum motor means and maintaining the proper drum velocity.

14 Claims, 6 Drawing Figures

METHOD AND APPARATUS FOR PROVIDING A STABLE, HIGH GAIN SERVO SYSTEM

BACKGROUND OF THE INVENTION

The present invention relates to a method and apparatus for accurately regulating a selected operating variable of a load. The invention more particularly relates to a servo system including analog error detection as an indication of the accuracy of the regulated operating variable of the load.

A portion of a magnetic tape recording and reproducing system is described below as a preferred environment for the present invention. The invention is not limited to such recording and reproducing system environment; however, it provides a particularly representative application for the invention because of the need for very accurate regulation in order to achieve high fidelity reproduction. In most such magnetic tape recording and reproducing systems, signal transmission is achieved by rotating magnetic recording and reproducing transducer heads at high speeds in a path scanning across the magnetic tape as the path itself is longitudinally advanced past the rotating transducer assembly. The greater magnitude of head to tape speed achieved by such an arrangement has made practical the recording and reproducing of broadcast quality video signals.

Due to timing complexities and also because of the speed and phasing control requirements of the transport itself, such systems commonly include a variety of servo mechanisms and servo control systems or circuits for closely establishing stability and fidelity of the reproduced signal.

Within such recording and reproducing systems, a particularly accurate servo system is needed for the regulation of one or more operating conditions of the head and/or tape transport or the like. Such servo systems are typically employed to control both position and/or velocity operating variables of the rotating head drum motor. Position control is accomplished within the servo system by comparing a first signal, proportional to the rotation of the head, to a reference signal in order to maintain accurate control over the rotation by regulation of the motor. For example, a tach pulse may be generated by a head drum tachometer, typically one pulse for each revolution of the head drum, in order to provide a signal for comparison by the servo system.

Within a servo system employed to control position of the rotating head drum relative to the tape, the tach pulse may be compared with a reference position pulse. The reference position pulse may commonly be directly recorded upon the tape along with the recording of video signal information and thus be available during playback for access by the servo system.

With such a reference position signal or pulse being available, the interval between the occurrences of the tach pulses and a series of reference position pulses may be measured to obtain an indication of error in the position of the tape or head drum motor. It is thereafter only necessary to generate a signal representative of the position error for adjusting the motor drive and correcting the relative position of the head drum motor or the tape itself.

Other servo systems may be employed to control the operating velocity of the head drum motor. Within such servo systems, a similar error signal is generated to represent variations of the intervals between consecutive head rotation related tach pulses. The intervals between the consecutive pulses of course provide an absolute indication of the velocity for the head drum while the error signal or the change in consecutive intervals provides an indication of the rate of change in velocity.

Servo systems of the type employed for such applications may be commonly characterized as including either analog or digital components having the basic function of measuring the interval between occurrence of signals.

Analog servo systems are generally characterized by the generation of a ramp signal. The ramp signal may be employed, for example, to represent a time period which is indicated as an amplitude change, usually voltage, during the interval of the ramp. The ability to accurately measure the time period thus depends upon very accurately determining the slope of the ramp. However, the slope of the ramp is often limited because of the need for its amplitude to change linearly for the entire time interval covered by the ramp. Even further, slope variation of the ramp is common and usually result from various factors such as environmental changes including temperature increases or decreases as well as changes within the servo system itself.

Accordingly, such a simple analog based servo system may not be effective for detecting minute changes in the time period on the order of ± 0.02 percent, for example, as may be commonly necessary in regulating head drum velocity.

One method for adapting such an analog based servo system to provide the necessary accuracy is to increase the gain or amplitude range for the servo. In other words, the steepness of the ramp slope may be increased by providing for a greater change in voltage across the ramp. In this manner, the slope of the ramp may be made steeper in order to permit more accurate measurement. However, the voltage range inherent within such a high amplitude ramp may cause additional problems. For example, where a servo for regulating velocity is used in combination with another servo for regulating position of the head drum, the velocity servo should be AC coupled to the motor drive in order to avoid inducing instabilities within the position servo system. With such an AC coupling arrangement, the servo system is effective only to provide information as to the magnitude of velocity change. Unlike DC coupling, an AC coupling does not provide information relating to absolute velocity at any instant. This again limits the accuracy with which the motor drive may be regulated by the servo system and, in effect, partially defeats the purpose of employing a higher amplitude ramp in order to increase sensitivity of the servo system.

It has also been known to employ digital components within a servo system. For a servo system employed to control velocity of a drum head, a digital system might be employed to count reference clock pulses between successive tach pulses. A servo system employing such a digital component or binomial counter provides a precise measure of the time interval between pulses. However, such digital components tend to be characterized by a one count ambiguity. For example, a digital counter may be programmed to change count either at the rising or falling edge of a square pulse from a reference clock. When a measured signal or pulse is received at a time just prior to a change of count within the counter, the counter thereafter is reset at the subsequent count which thus closely corresponds to the actual or measured time. However, if the tach signal is received just after a change of count within the counter, the next count to which the counter is reset is almost a full count subsequent to the actual time. Accordingly, the measured count as produced by such a digital counter, at the end of a measured time interval, is only considered accurate within one count.

The count ambiguity described above has been found to be a particular problem in such servo systems since it tends to cause jitter in the regulated motor velocity or position, thus interfering with proper movement of the tape.

There has accordingly been found to remain a need for a more accurate servo system for overcoming one or more problems of the type described above.

SUMMARY OF THE INVENTION

It is therefore an object of the present invention to provide accurate control in a variety of servo mechanisms wherein it is desired to regulate an operating variable condition relative to that of a reference.

It is a further object of the invention to provide a method and apparatus for accurately measuring the relative occurrences of events by generating a ramp signal toward the beginning of the occurrence of a first event, interrupting the ramp signal for a predetermined duration and thereafter continuing generation of the ramp signal to provide a means for accurately measuring the occurrence of a second event.

It is another object of the invention to provide such a control circuit for a servo system where the ramp signal is generated by an analog component and the predetermined interruption of the ramp signal is digitally regulated to establish the interruption for a predetermined duration followed by a recommencement of the ramp signal.

It is an even more specific object of the invention to provide such a control circuit for a servo system wherein the interruption of the ramp signal is regulated by a digital means which is further operable to maintain the proper sequence of the analog component in the absence of a first signal or pulse normally employed to initiate the timing function of the analog component.

Still another object of the invention is to delay commencing generation of the ramp signal for a predetermined interval following commencement of the time period in order to balance the servo system by adjusting the period or duration within which the ramp is generated rather than by adjusting the slope of the ramp.

These objects are accomplished within a control circuit for a servo system or the like through the use of an analog component for generating a ramp signal. Commencement of the ramp signal is preferably delayed to occur at a closely controlled time following initiation of the time interval to be measured. After its initiation, the ramp signal is interrupted for a predetermined duration and thereafter recommenced for continuation toward the end of the time interval. Accordingly, the slope of the ramp may be substantially increased in order to permit more accurate measurement at the end of the time interval.

The control circuit of the present invention is particularly contemplated for but not limited to the measurement of time intervals which tend to vary only within relatively close limits. Accordingly, it is particularly contemplated within the invention that the interruption interval of the ramp signal occupy a substantial portion of the time interval. In this manner, the "linear dynamic range" of the control circuit or servo system is restricted. However, this is not believed to be disadvantageous since the limited linear dynamic range of the servo system results in a greatly increased gain or linear slope of the ramp signal in order to permit very accurate measurement at the end of the time interval.

Preferably, the interruption of the ramp signal is accomplished by a digital counter which may also be employed to maintain the proper sequence of the analog circuit and also to reset the entire control circuit for each successive time interval to be measured. However, it will be apparent from the following description that a digital counter is only one exemplary device which may serve the purpose of establishing an interruption of predetermined duration for the ramp signal. The interruption of the ramp signal could also be accomplished for example by an alternate counter device, other binary devices or even an analog delay device serving a similar purpose of interrupting generation of the ramp signal for a predetermined duration and thereafter permitting continuation of the ramp signal.

Another particular advantage of the present invention may be seen through the combined use of an analog component and a time delay component such as a digital counter which overcomes the disadvantages of both types of components. As noted above, use of an analog component by itself would tend to limit the gain within a ramp signal employed across the entire time interval. By the same token, counter devices such as a digital component tend to be characterized by a timing ambiguity of up to one count. Through the combination of these components in the manner of the present invention, the limitation for each may be overcome. It will be obvious from the following description that interruption of the ramp signal from an analog component permits the ramp to be very steep, thus providing very high gain for the ramp signal at the end of the time interval. At the same time, the digital or other time delay component is employed to establish an interruption of predetermined constant duration so that the possibility of a count ambiguity is avoided.

Additional objects and advantages of the present invention are made apparent in the following description having reference to the accompanying drawings.

DESCRIPTION OF THE PREFERRED EMBODIMENT

The control circuit contemplated by the present invention for use in a variety of servo systems or the like and described below particularly in connection with a selected servo system is readily employable in generally any type of servo mechanism or the like. Basically, the control circuit is adapted to measure a time interval T with a high degree of accuracy by commencing generation of a ramp signal at a time known relative to the beginning of the time interval, thereafter interrupting the ramp signal for a predetermined duration and subsequently continuing its generation whereby the ramp signal is characterized by a high gain feature for accurately measuring the end of time interval.

Figure 1:
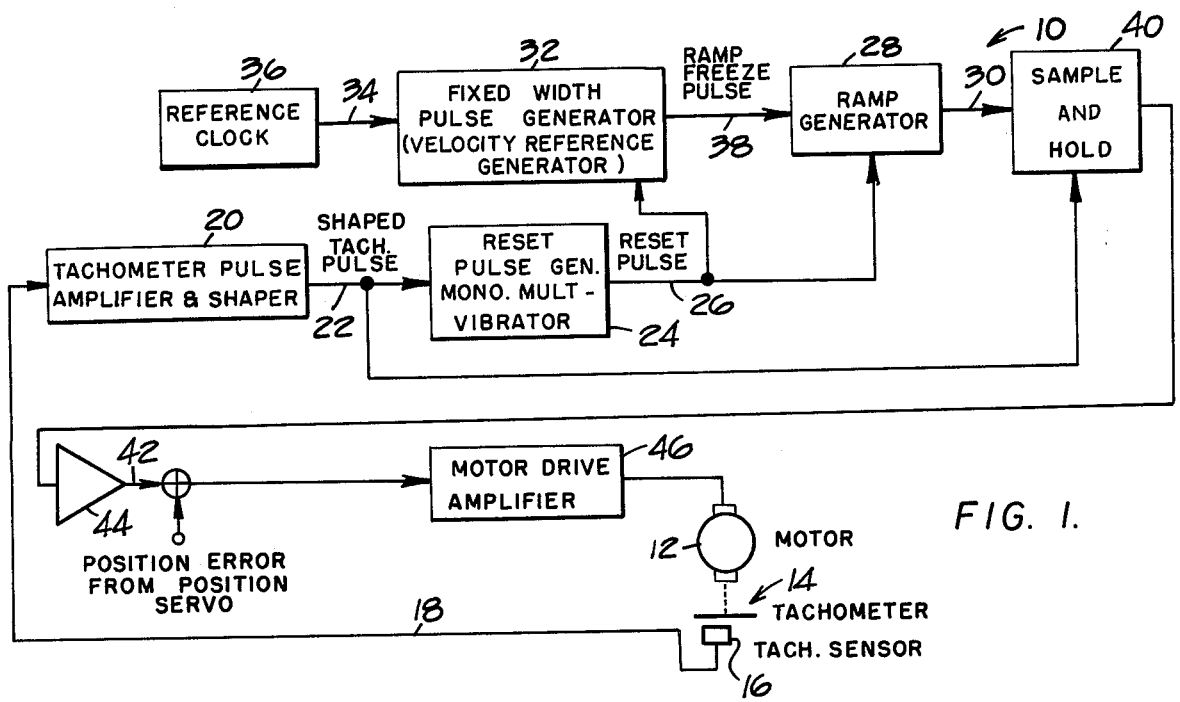
FIG. 1 is a block diagram for a control circuit of a servo system embodying the present invention.

The control circuit of the present invention may be best summarized by initial reference to FIG. 1 which, as indicated above, is a block diagram of a servo system according to the present invention. Here again, it is emphasized that a control circuit constructed and operated in accordance with the present invention may be employed to control one or more operating characteristics such as velocity or position of a device such as a rotating magnetic head in a record and reproduction system. The servo system illustrated in the drawings relates specifically to the control of velocity for the head motor drive of such a record and reproduction system.

Referring now to FIG. 1, the servo system indicated at 10 is adapted to control operating velocity of a drum motor 12 associated with a tachometer 14 including a tach sensor 16.

The tachometer 14 is arranged so that a tach pulse is generated by the sensor 16 for each revolution of the motor 12. Accordingly, the occurrence of the tach pulse is representative of the rotational position of the motor. Also, the rate of occurrence of successive tach pulses is indicative of operating velocity for the motor 12.

As indicated above, the servo system 10 is adapted to control velocity of the motor 12 and accordingly includes means for accurately measuring the interval between successive tach pulses in order to generate an error signal which is fed back to the motor 12 for adjusting its speed.

Initially, a tach pulse 18 from the sensor 16 is communicated to a tach pulse amplifier and shaper 20 which generates an accurately defined, narrow shaped tach pulse 22 suitable for initiating one or more functions performed by various components of the control circuit.

The shaped tach pulse 22 is received by a reset pulse generator 24 which in turn produces a reset pulse 26 having a precisely defined period, the reset pulse 26 being communicated to a ramp generator 28 which normally functions within the control circuit to generate a ramp signal 30.

The ramp generator is subject to regulation or interruption by a fixed width pulse generator 32 which is also responsive to the reset pulse 26 for performing a number of functions. Initially, the fixed width pulse generator 32 is adapted to receive a continuous sequence of timing impulses 34 from a conventional reference clock 36.

The fixed width pulse generator and ramp generator are responsive to termination of the reset pulse 26 so that the ramp generator immediately commences generation of the ramp signal. After a selected interval, the fixed width pulse generator interrupts generation of the ramp signal for a predetermined constant time period selected to occupy a substantial portion of the time interval T. For this purpose, the fixed width pulse generator communicates a ramp freeze pulse 38 to the ramp generator 28. After completion of the ramp freeze 38, the ramp generator 28 recommences generation of the ramp signal 30.

The termination of each time interval T to be measured by the control circuit is reflected in a preferred form of the present invention by the occurrence of a tach pulse. The tach pulse is coupled to cause a ramp sample and hold device 40 to sample the final voltage level of the ramp signal.

This final voltage level represents the velocity of the motor 12. An error representative of changes in motor velocity is derived from the final voltage level. This error signal is communicated to a motor drive amplifier 46, in order to make necessary adjustments in the actual operating velocity of the motor 12.

In this manner, the closed servo loop 10 serves to continuously adjust the operating velocity of the motor 12 in accordance with its instant actual velocity as determined by the tachometer 14.

Figure 2:
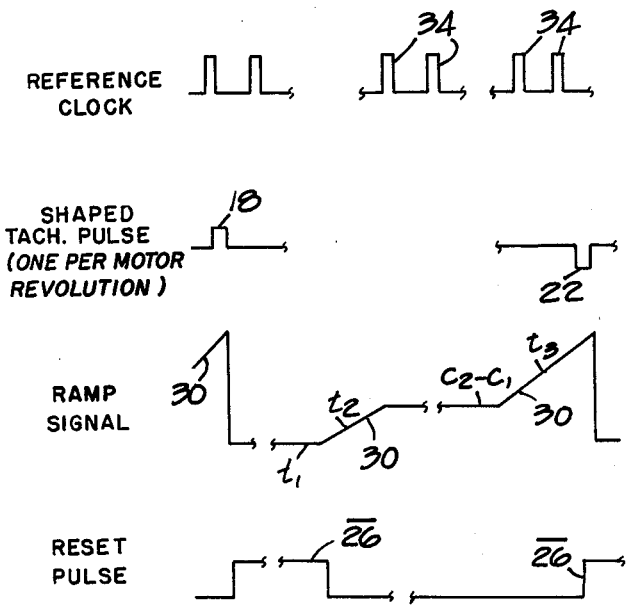
FIG. 2 is a graphical representation of the interrupted ramp signal generated by the present servo system control circuit for measuring a time interval T.
Figure 2:
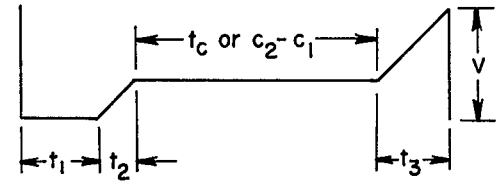

The configuration of an interrupted ramp signal as generated by the control circuit of FIG. 1 may be best seen within the graphical representation of FIG. 2. Referring to FIG. 2, the overall time interval between successive tach pulses is T, which is shown in the graphical representation of FIG. 3, the graphical representations of FIGS. 2 and 3 being on the same time scale. The interval T is comprised of an initial time interval $t_1$ corresponding to the length of the reset pulse 26 (see FIG. 1). The initial time interval $t_1$ is followed by commencement of the ramp signal 30 which in turn is shortly thereafter interrupted for a predetermined duration. The duration of the initial portion of the ramp prior to its interruption is indicated at $t_2$.

Thereafter, the interruption of predetermined constant duration is indicated at $t_c$ which is equivalent to a count period of $C_2 - C_1$. The counts $C_2$ and $C_1$ both commence immediately after termination of the reset pulse 26. The initial count $C_1$ determines commencement of the interruption $t_c$ while the second count $C_2$ determines completion of the interruption $t_c$ and recommencement of the ramp signal 30. The duration of the recommenced ramp signal up to occurrence of a subsequent tach pulse is indicated at $t_3$. This completes the time interval T between a first tach pulse and a successive tach pulse.

Upon occurrence of the successive tach pulse, a new shaped tach pulse 22 is generated by the tach pulse amplifier 20. Similarly, a new reset pulse 26 is generated by the reset pulse generator 24 (see FIG. 2) so that the same counting or measuring sequence for a subsequent time interval T is then commenced.

Figure 3:
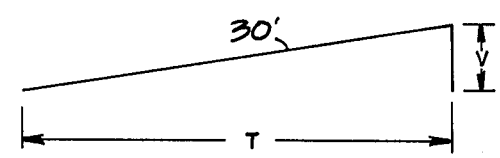
FIG. 3 is a similar graphical representation of an uninterrupted ramp signal generated by a conventional prior art device for measuring a similar time interval T.

The high gain characteristic for the ramp signal made possible by the present invention may be readily seen by comparing FIG. 2 with a conventional ramp signal generated by a prior art device for a similar time interval T as illustrated in FIG. 3. In FIG. 3, it may be seen that the ramp 30' is rising or gaining amplitude across the entire time interval T. Within the present invention as illustrated in FIG. 2, on the other hand, only a small portion of the time interval T is occupied by actual generation of the ramp signal 30. Accordingly, the ramp signal of the present invention may have a substantially steeper configuration or higher gain within the same voltage limits established for the entire ramp signal 30' in the prior art.

Having reference again to FIG. 2, it may be seen that following the initial period $t_1$, both of the reference counts $C_1$ and $C_2$ are commenced. After $C_1$ counts, generation of the ramp signal is interrupted and after $C_2$ counts, the ramp signal is again generated until completion of the time interval T. Thus, since the reference clock pulses 34 are provided at a fixed rate, the interval of interruption of the ramp is always constant for a time corresponding to the count differential, $C_2-C_1$. Further, if the time interval T changes, that change is reflected as an earlier or later resetting of the ramp signal as identified by initiation of the reset pulse 26. This enables the count period $C_2-C_1$ to be accurately determined by digital means while avoiding the problem of ambiguity as discussed above.

Figure 4:
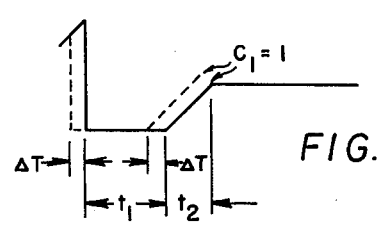
FIG. 4 is a graphical representation illustrating a variation ΔT in the time interval T and its effect on generation of the interrupted ramp signal within the present invention.

Variations in the speed of motor 12 are reflected by relative changes in the occurrences of the resetting of ramp signal 30. With reference to FIG. 4, two ramp reset occurrences are illustrated. As illustrated, if the second one of consecutive intervals defined by a series of tach pulses is shorter, the ramp signal 30 will be reset at an earlier time by an amount $\Delta T$ than if the consecutive intervals were of equal length. Since the ramp reset pulse 26 is of fixed duration, the time at which the ramp signal 30 is initiated occurs earlier. As previously described, the initiated ramp signal 30 is interrupted or frozen, which in the particular embodiment described herein happens upon the occurrence of the first reference clock pulse $C_1$ following the end of the ramp reset pulse. Assuming that the $\Delta T$ change between successive intervals is not a whole number multiple of the reference clock period, the ramp signal 30 will be frozen at a different time during the interval between the end of the ramp reset pulse (which is fixed in time relative to the tach signal 18) and the occurrence of the first following reference clock pulse, $C_1$. From the foregoing, it will be appreciated that any variation of the times of successive intervals that is fractionally related to the reference clock period will be reflected as a difference in the total interval defined by the beginning of the ramp reset pulse and the occurrence of the first reference clock pulse following the end of the ramp reset pulse. However, because the ramp reset pulse is of fixed duration, only the interval of the initial portion of the ramp signal is varied. In this fashion, all variations in the interval, T, between successive tach pulses is reflected only in variations of the ramp interval.

Before setting forth a more detailed discussion of a velocity servo system as illustrated in FIG. 5, it is again pointed out that the overall ramp amplitude (see FIG. 2) corresponds with a voltage representing the absolute magnitude of the time interval T. Since the rise period for the ramp signal is limited to a fraction of the entire time interval, $(t_2+t_3/T)$, the servo system has a limited linear dynamic range as discussed above but very high gain and sensitivity characteristics since each unit change in ramp amplitude represents a small portion or change of the large time interval T.

It is again emphasized that the fixed duration, digitally counted interruption of the ramp signal, $C_2-C_1$ is the particular feature which permits the above-noted characteristics of high gain and sensitivity. In other words, the use and fixed interval segmentation of an analog generated ramp signal avoids the ambiguity problem characteristic of digital servo systems. At the same time, the ramp interruption, accurately accomplished within the present embodiment of the invention by digital means, makes possible the high gain and sensitivity for measurement of the time interval T.

Figure 6:
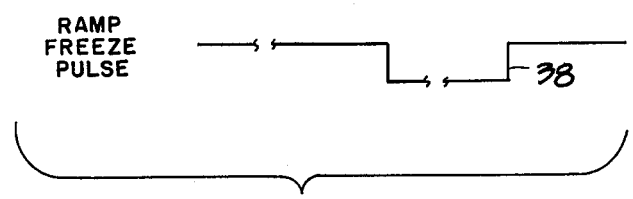
FIG. 6 is a composite and time-related graphical representation of a number of different signals generated within the control circuit of FIG. 5.
Figure 5:
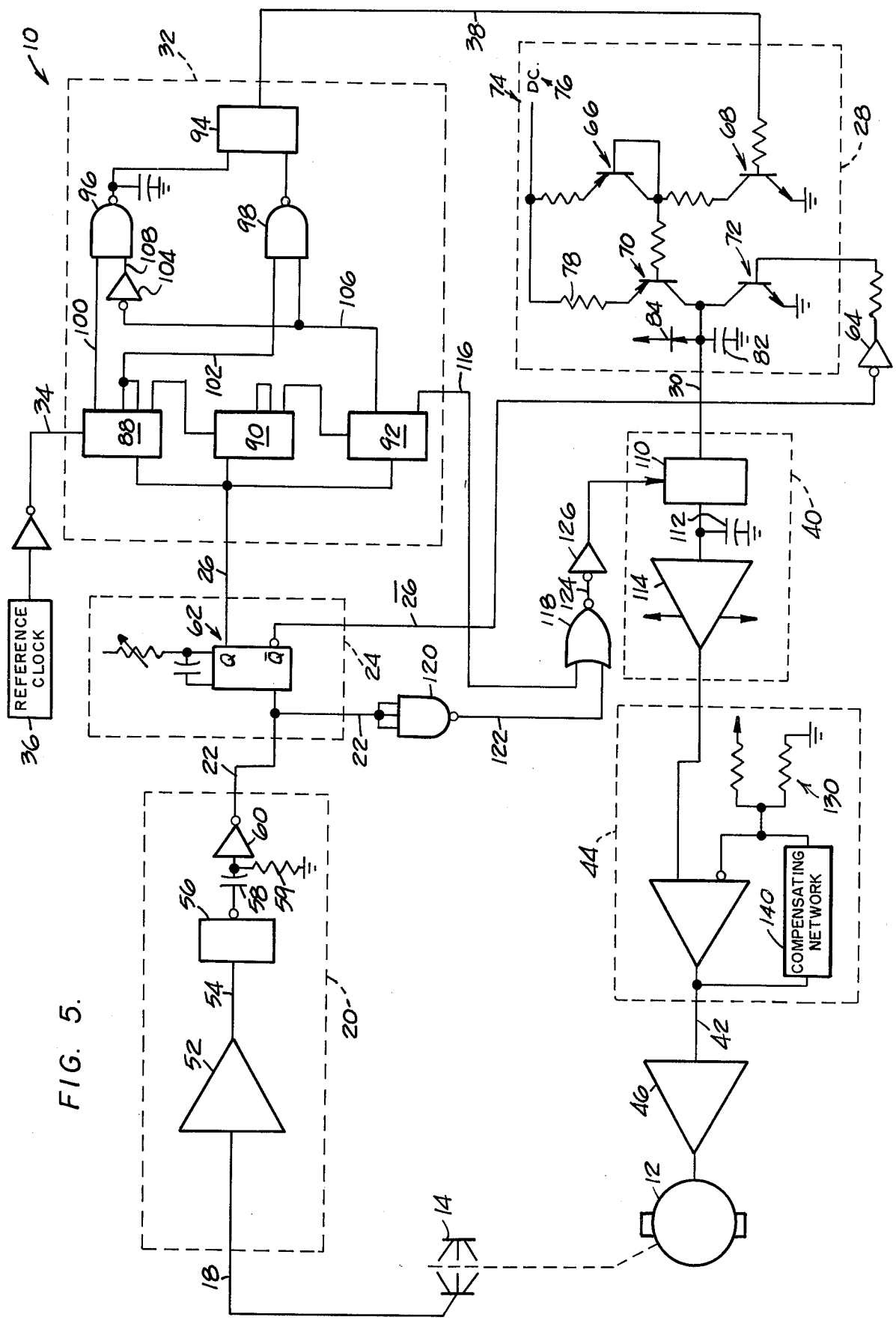
FIG. 5 is a schematic representation of a combined analog-digital control circuit for a servo system according to the present invention.

Within the following more detailed discussion of the servo system having reference to FIG. 5, it will be noted that various signals which are generated within the control circuit are also illustrated in time-related fashion within FIG. 6. Accordingly, the relationship of the various signals as described below in connection with FIG. 5 may be clearly seen by combined reference to FIGS. 2 and 6 in particular.

Referring now to FIG. 5, the tach pulses 18 are received by the tach pulse amplifier and shaper 20 which includes an amplifier 52 for generating an amplified tach pulse as indicated at 54.

The tach pulse amplifier and shaper 20 also includes a monostable multivibrator 56, which, together with a capacitor 58 and resistor 59 generates, at a well defined trailing edge of the tach pulse, the accurately defined narrow width tach pulse 22 for each of the tach signals 18. The narrow width tach pulses are inverted by inverter 60 and are communicated to the reset pulse generator 24 which also comprises a conventional monostable multivibrator 62 for generating the reset pulses of duration $t_1$. The multivibrator 62 is edge triggered by the trailing positive going edge of the shaped tach pulse 22 to generate the reset pulse. An inverted form $\overline{26}$ of the reset pulse 26 is communicated through another inverter 64 to the ramp generator 28 in order to reset the ramp generator to a set level and prevent generation of the ramp signal for the duration of the reset pulse $t_1$.

The ramp generator 28 comprises an array of four transistors 66, 68, 70 and 72 together with a conventional charging circuit 74 including a DC source 76, a resistor 78, and a capacitor 82. The transistor array charging circuit normally functions to produce a rising voltage corresponding to the ramp signal indicated at 30. The output voltage from the transistor array is formed by a capacitor 82. Diode 84 establishes an upper voltage limit for the ramp signal. For example, within the embodiment of FIG. 5, the upper limit for the ramp is established at approximately +5.6 volts.

Generation of the ramp signal 30 by the transistor array within the ramp generator 28 may be frozen or interrupted either by the reset pulse $\overline{26}$ passed through the inverter 64 and applied to the base of the transistor 72 or by the ramp freeze pulse 38 being applied to the base of the transistor 68 from the fixed width pulse generator.

Returning now to the fixed width pulse generator 32, it includes three digital or binary counting devices 88, 90 and 92 arranged in series with each other and with the timing pulses 34 from the reference clock 36. In addition, each of the binary counting devices 88, 90 and 92 is coupled with the reset pulse 26 which is thus operable to entirely reset the counter function within the fixed width pulse generator.

The ramp freeze pulse 38 is produced by a bistable flip-flop 94 which may be established either in a first stable condition for generating the ramp freeze pulse to inhibit or disable generation of the ramp signal 30 or in a second stable condition. In the second condition, the ramp freeze pulse 38 is not generated and the fixed width pulse generator 32 permits generation of the ramp signal 30.

The counting devices 88, 90 and 92 are coupled with the flip-flop 94 through a pair of AND gates 96 and 98 in order to selectively establish the bistable condition of the flip-flop 94. Because of the series arrangement of the counting devices 88, 90 and 92, the first device 88 is conditioned to count by units of 1 up to 10. The second counting device 90 is responsive to the device 88 to count by tens up to 100, while the third counting device 92 is responsive to the device 90 for counting in units of 100 up to a maximum count of 1000. In addition, the one count terminal for the counting device 88 is connected with the AND gate 96 as indicated at 100. The four count terminal for the counting device 88 is similarly connected with the AND gate 98 as indicated at 102. Also, the 200 count terminal for the third counting device 92 is connected with the other side of the AND gate 98 and an inverter 104 by a branched connection 106. The output 108 of the inverter 104 is coupled to the other side of the AND gate 96.

The ramp sample and hold device 40 includes a sample and hold gate 110 for selectively sampling the level of the ramp signal 30 (at the end of the interval T) and causing that voltage level to be stored in a hold capacitor 112. The stored voltage represents the velocity of the motor 12.

The sample and hold gate 110 is operated by either the narrow width tach pulse 22 or by a "false tach pulse" generated by the third counting device 92 upon its reaching a count of 800. Accordingly, the 800 count terminal for the third counting device is connected at 116 with one side of an OR gate 118. This feature is described in greater detail below during a description of a mode of operation for the servo system.

Returning to the amplifier and shaper 20, its narrow width tach pulse 22 is also communicated to an inverter 120 having an output 112 connected to the other input of the OR gate 118. The output 124 is connected through an inverting driver 126 to the sample hold gate 110 in the ramp sample and hold device 40. Thus, the narrow width tach pulse 22, generated in response to an actual tach signal or a false tach signal from the third counter device 92, is effective to cause the sample and hold gate 110 to perform the sampling function of the device 40 in order to produce the velocity signal 42.

Operation of the servo system of FIG. 5 may be better seen by reference to FIGS. 2 and 6, as well as FIG. 5.

In operation, the tach pulse amplifier and shaper 20 responds to each tach pulse 18 by producing the inverted narrow width tach pulse 22. The tach pulse 22 causes the reset pulse generator to generate the reset pulse 26 having a duration $t_1$. The $\overline{26}$ form of the reset pulse 26 is also applied through the inverting driver 64 to the transistor 72 in order to reset the ramp generator 28 to the set level and prevent it from producing the ramp signal 30 for the duration of the reset pulse. The narrow width tach pulse 22 is passed through the inverter 120 and OR gate 118. Therefore, prior to the resetting of the ramp generator 28, the sample and hold gate 110 is signaled to cause the final voltage level of the ramp signal 30 to be stored in the hold capacitor 112. As indicated above, the reset pulse 26 is also communicated to each of the counting devices 88, 90 and 92 in order to reset the entire counter array for the duration of the reset pulse.

Upon completion of the reset pulse, the disable is removed from the transistor 72, permitting the transistor array to commence generating the ramp signal 30. Simultaneously, the disable is also removed from the counting devices 88, 90 and 92 so that the first counting device 88 commences functioning in response to the timing pulses 34 from the reference clock 36. On the first count of the counting device 88, a high level signal is produced in the connection 100 which is passed by the AND gate 96. This causes the state of the flip-flop 94 to be changed with an inhibiting signal being applied to the base of the transistor 68 for interrupting generation of the ramp signal. Interruption of the ramp signal continues until the flip-flop 94 is again shifted back to its other state in a manner described immediately below.

The counting function of the devices 88, 90 and 92 continues with a high level signal being produced in the connection 102 at a count of four. As the third counting device 92 reaches a 200 count, a high level signal is also produced in the branched connection 106 which serves two functions. Initially, that high level signal is applied through the inverter 104 to inhibit operation of the AND gate 96 from responding to one count signals from the counting device 88 while the high level state of the connection 106 is maintained.

Also, the high level signal in the line 106 is applied to the other side of the AND gate 98. Thereafter, as the first counting device 88 again approaches a four count (a total of 204), a high level signal is also developed in the connection 102 causing the AND gate 98 to apply a signal to the flip-flop 94 which reverts to its initial state. This condition terminates the ramp freeze pulse 38 as well as the interruption of the ramp signal since the ramp generator 28 is again free to continue generation of the ramp signal.

Generation of the ramp signal thereafter continues until a new tach pulse 18 is received by the tach pulse amplifier and shaper. At that time, a subsequent narrow width tach pulse is communicated to the reset pulse generator 24 and to the sample and hold gate 110 through the inverter 120, the OR gate 118 and the inverter 126. At that time, the reset pulse 26 again resets the three counting devices 88, 90 and 92 while also being communicated through the inverter 64 for application to the base of the transistor 72 in order to again block generation of the ramp signal.

The voltage level stored on capacitor 112 at the sample time is coupled by a voltage follower 114 to one input of the velocity error amplifier 44. A second input of the velocity error amplifier is coupled to a resistive network 130 which establishes a reference for comparison with the voltage level related signal provided by voltage follower 114. The velocity error amplifier is of conventional design and includes suitable feedback servo compensating network 140. The velocity error amplifier operates to provide a velocity error signal coupled by a motor drive amplifier 46 for application to the motor 12 in order to make any necessary correction in the velocity of the motor.

The digital counting array within the fixed width pulse generator also serves an additional function of maintaining control over the sample and hold circuit 40 in the absence of tach signals. For this purpose, it is assumed that generation of the ramp signal has been initiated by a first tach pulse and interrupted by the counting device 88 reaching a one count. A high level signal is thereupon directed through the AND gate 96 to the flip-flop 94 which applies the ramp freeze pulse 38 to the transistor 68. It is assumed that a subsequent tach pulse is not received or responded to by the tach pulse amplifier. In that event, the AND gate 96 is inhibited by the high level signal in the branched connection 106. Accordingly, when the flip-flop 94 is returned to its original state by a signal from the AND gate 98 at a count of 204, that condition is maintained since no further signal may be applied to the flip-flop from the connection 100. Therefore, the ramp generator 74 continues to operate to charge capacitor 82.

Upon the third counting device 92 reaching a count of 400, the condition of the branched conduit 106 reverts to a low level signal which terminates the inhibit on the AND gate 96. Accordingly, on the next one count, the counting device 88 again generates a high level signal in the connection 100 which is passed by the AND gate 96 and causes the flip-flop 94 to again revert to its secondary state for applying the ramp freeze pulse 86 to the transistor 68. The ramp signal is thereupon again interrupted. If the counting function of the devices 88, 90 and 92 continues further without receiving a subsequent tach pulse, a high level signal is again developed within the branched connection 106 at a count of 600. At a subsequent count of 604, a signal is applied to the flip-flop 94 by the AND gate 98 causing it to revert to its initial state, thereby terminating the ramp freeze pulse 86. Because capacitor 82 has previously charged to the limit determined by diode 84 and associated supply, this second ramp freeze sequence has no effect on ramp signal 30.

At a count of 800, a high level signal is developed in the connection 116 and applied through the OR gate 118 to the sample and hold gate 110. This signal may be considered a "false tach signal" since it has the same effect as application of the narrow width tach pulse 22 through the inverter 120, the OR gate 118 and the inverter 126 to the sample and hold gate 110.

As the third counting device 92 subsequently approaches a maximum count of 1000, a low level signal is again developed in the connection 116 to terminate generation of the false tach pulse.

Thus, the ramp generator and ramp sample and hold device remain under proper control even in the absence of tach pulses being supplied to the amplifier and shaper 20. It may be seen that the connection 116 tends to supply such a false tach pulse, for example, during start-up conditions when no tach pulse is present before the counter array reaches a count of 800. During the interval of the false tach signal, the capacitor 82 remains fully charged because the ramp generator 28 continues to provide current to the junction of the diode 84 and capacitor 82. The sample and hold gate 110, which is enabled during the interval of the false tach pulse, couples the ramp generator 28 to the velocity error amplifier 44 whereby maximum drive is provided to the motor.

The servo system is conveniently balanced by adjusting period $t_1$ to, thereby, calibrate period T. This servo balancing is accomplished by adjusting the resistor of the time constant determining RC network of the monostable multivibrator 62. As will be appreciated, adjusting the time constant has the effect of changing $t_1$, hence, T.

Thus, there has been described a very accurate control circuit for use within a variety of servo mechanisms. Although the preceding description relates to a servo system for controlling the velocity of a motor, it should be readily apparent that the control circuit of the present invention may also be used in other servo systems, including those of non-electromechanical nature. For example, a similar servo system could be employed to control position of a device. Referring again briefly to FIG. 1, it may be seen that the servo system described above is employed in combination with a position servo system for providing common regulation over a motor. A similar control circuit might be employed within such a position servo system. A reference position signal would then be employed to start the initial reset pulse interval $t_1$ and a similar tach pulse could be employed to reset the ramp signal or the reverse.

Other changes and variations are also believed to be clearly apparent within the scope of the present invention. Accordingly, the present invention is to be taken as encompassing all variations falling within the scope of the appended claims.

What is claimed is:

1. A servo system for controlling an operating variable of a mechanism, comprising:
   means coupled to the mechanism for generating a ramp signal having an amplitude that varies with time to a level determined by the state of the operating variable;
   means for generating clock pulses at a rate greater than the rate of occurrence of said ramp signal;
   ramp interrupt means coupled to the ramp signal generating means and the clock pulse generating means for interrupting the amplitude variation of the ramp signal upon the occurrence of a clock pulse following the initiation of the ramp signal to maintain said ramp amplitude constant for a period corresponding to a predetermined number of clock pulses and for recommencing the ramp signal's amplitude variation with time at the end of the period; and
   means coupled to the ramp signal generating means for detecting the recommenced ramp signal to initiate the generation of a drive signal for controlling the operating variable of the mechanism in accordance with the detected ramp signal.

2. The servo system of claim 1 further comprising a tachometer means operatively coupled to the mechanism for generating a tach signal representative of the operating variable of the mechanism, and wherein the ramp signal generating means is coupled to the tachometer means and is responsive to the occurrence of tach signals to provide ramp signals having detected levels that vary according to changes in the operating variable of the mechanism.

3. The servo system of claim 2 adapted for controlling the velocity of a moving mechanism wherein the ramp generating means is responsive to each tach signal to initiate the generation of a ramp signal a fixed interval after the occurrence of said tach signal, and the ramp signal detecting means is coupled to the tachometer means and is responsive to a succeeding tach signal generated by the tachometer means to provide a control signal representative of the amplitude of the recommenced ramp signal for effecting the generation of the drive signal.

4. The servo system of claim 1 wherein the ramp interrupt means includes a counter coupled to receive and count the clock pulses, and the counter is coupled to the ramp signal generating means for interrupting the amplitude variation of the ramp signal when the counter reaches a first count state in response to received clock pulses and for recommencing the ramp signal's amplitude variation when it reaches a second count state in response to received clock pulses.

5. The servo system of claim 4 wherein the counter is coupled to be reset prior to each generation of the ramp signal and to continue counting clock pulses in absence of being reset, and further comprising means responsive to the counter in absence of said counter being reset within a selected interval following each generation of the ramp signal for causing the ramp signal generating means and ramp signal detecting means to initiate the generation of a constant control signal for controlling the operating variable of the mechanism.

6. The servo system of claim 4 further comprising a tachometer means operatively coupled to the mechanism for generating tach signals representative of the operating variable of the mechanism, the ramp signal generating means is coupled to the tachometer means for generating ramp signals in response to the occurrence of first and succeeding tach signals, the ramp signal generating means is further responsive to each of the tach signals for terminating the generation of a previous ramp signal, the ramp signal detecting means is coupled to the tachometer means for generating a control signal representative of the amplitude of the recommenced ramp signal in response to each of said tach signals, said control signal is coupled to initiate the generation of the drive signal in accordance with the represented amplitude, and the counter is coupled to the tachometer means to be reset in response to each of said tach signals.

7. The servo system of claim 6 wherein the ramp signal generating means is coupled to the tachometer means for initiating the generation of each ramp signal a fixed interval following the termination of the previously generated ramp signal.

8. The servo system of claim 7 wherein the ramp signal detecting means includes an electronic gate and a storage means coupled to an output of the electronic gate, the electronic gate is responsive to each of said tach signals to couple the storage means to the ramp generating means for storing a signal representative of the amplitude of recommenced ramp signal upon the occurrence of said tach signal, and further comprising drive means for generating the drive signal, the drive means is responsive to the stored signal to generate the drive signal in accordance with the amplitude of the recommenced ramp signal represented by the stored signal.

9. The servo system of claim 1 further comprising means for generating a ramp initiating signal a fixed interval following the conclusion of each ramp signal, the ramp signal generating means responsive to each ramp initiating signal for generating the ramp signal.

10. The servo system of claim 1 further comprising a tachometer means operatively coupled to the mechanism for generating tach signals representative of the operating variable of the mechanism, and means coupled to the tachometer means for generating a ramp initiating signal a fixed interval following the occurrence of each tach signal, and wherein the ramp signal generating means is responsive to each ramp initiating signal for generating the ramp signal.

11. A servo system for controlling the velocity of a moving mechanism coupled with a tachometer means generating tach signals at a rate proportional to the operating velocity of the mechanism, comprising:

means for generating clock pulses at a rate substantially greater than the rate of the tach signals when the mechanism is operating at a nominal velocity;

means coupled to the tachometer means for generating a ramp initiating signal a fixed interval following the occurrence of each tach signal;

means coupled to the ramp initiating signal generating means and responsive to each ramp initiating signal for initiating the generation of a ramp signal having an amplitude that varies with time;

ramp interrupt means coupled to the ramp signal generating means and to the clock pulse generating means for interrupting the amplitude variation of the ramp signal upon the occurrence of a clock pulse following the initiation of the generation of the ramp signal to maintain the ramp amplitude constant;

ramp recommencement means coupled to the ramp signal generating means and to the clock pulse generating means for recommencing the amplitude variation of the ramp signal upon the occurrence of a predetermined number of clock pulses following the interruption of the ramp amplitude variation;

means coupled to the ramp signal generating means and responsive to each tach signal for sampling the amplitude of the recommenced ramp signal and thereafter terminating the generation of the ramp signal; and drive means coupled to the sampling means for providing drive signals to the moving mechanism in accordance with the sampled amplitude of the recommenced ramp signal and thereby control the velocity of the moving mechanism.

12. A servo system for maintaining the velocity of a motor at a selected value, comprising:

a tachometer means coupled to the motor for generating tach signals at a rate proportional to the velocity of the motor;

means for generating clock pulses at a rate substantially greater than the rate of tach signals provided by the tachometer means when the velocity of the motor is at the selected value;

a pulse generator coupled to the tachometer means for generating a ramp initiating pulse of a fixed width following the occurrence of each tach signal;

a ramp generator coupled to the pulse generator and responsive to the termination of the ramp initiating pulse for generating a ramp signal having an amplitude that varies with time;

a counter coupled to the pulse generator and the means for generating clock pulses for being reset by the ramp initiating pulse and for counting pulses following the termination of the ramp initiating pulse, the counter is coupled to the ramp generator for interrupting the amplitude variation of the ramp signal when the counter reaches a first count state in response to received clock pulses and for recommencing the ramp signal's amplitude variation when it reaches a second count state in response to received clock pulses;

means coupled to the ramp generator and responsive to each tach for sampling the amplitude of the recommenced ramp signal and thereafter terminating the generation of the ramp signal; and motor drive means coupled to the sampling means for providing drive signals to the motor in accordance with the sampled amplitude of the recommenced ramp signal to thereby maintain the velocity of the motor at the selected value.

13. The servo system of claim 12 further comprising means responsive to the counter in absence of the counter being reset within a selected interval for causing the ramp generator and the sampling means to initiate the generation of a control signal, and wherein the motor drive means is responsive to the control signal to generate a drive signal for increasing the velocity of the motor.

14. In a method of operating a servo system controlling the occurrence of events indicated by a first signal, the steps comprising:
   detecting the occurrence of the first signal;
   initiating the generating of a ramp signal after the detection of the first signal
   interrupting each ramp signal after an initial ramp interval for a predetermined number of clock pulses provided by a clock pulse source at a frequency greater than the frequency of generation of the ramp signal;
   recommencing the ramp signal following the occurrence of said predetermined number of clock pulses;
   monitoring the recommenced ramp signal; and
   adjusting the occurrence of the events in accordance with the monitoring of the recommenced ramp signal.

* * * * *